United States Patent [19]

Eyral et al.

[11] 4,142,937

[45] Mar. 6, 1979

[54] DEVICE FOR PROVIDING A LEAK-TIGHT PENETRATION FOR ELECTRIC CABLES THROUGH A REACTOR VAULT ROOF

[75] Inventors: Max Eyral, Ste. Geneviève des Bois; Armel Mahé, Palaiseau, both of France

[73] Assignee: Commissariat a l'Energie Atomique, Paris, France

[21] Appl. No.: 807,510

[22] Filed: Jun. 17, 1977

[30] Foreign Application Priority Data

Jun. 28, 1976 [FR] France .............................. 76 19594

[51] Int. Cl.$^2$ .............................................. G21C 13/06
[52] U.S. Cl. .................................... 176/87; 176/19 R
[58] Field of Search .................... 176/19 R, 36 W, 87

[56] References Cited

U.S. PATENT DOCUMENTS

| | | | |
|---|---|---|---|
| 3,549,494 | 12/1970 | Germer | 176/19 R |
| 3,766,005 | 10/1973 | Erkens | 176/19 R |
| 3,827,935 | 8/1974 | Grüner et al. | 176/19 R |
| 3,913,407 | 10/1975 | Hanff et al. | 176/19 R X |
| 4,012,282 | 3/1977 | Hutter et al. | 176/19 R X |

FOREIGN PATENT DOCUMENTS

| | | | |
|---|---|---|---|
| 777284 | 1/1968 | Canada | 176/36 W |
| 1093029 | 11/1967 | United Kingdom | 176/36 W |

*Primary Examiner*—Peter A. Nelson
*Attorney, Agent, or Firm*—Thomas R. Boland

[57] ABSTRACT

The device for providing a cable penetration through the vault roof of a liquid sodium cooled fast reactor comprises a vertical tube closed at the top end by a flange-plate. Electric cables connected to measuring and detecting instruments are passed through the flange-plate which is joined to the reactor vault roof in leak-tight manner and enclosed within a removable hood. At least one horizontal plate is mounted within the vertical tube and provided with orifices for the leak-tight passage of the cables. Cable storage reels are placed within the tube and can be locked in position or released by controlled mechanical means.

8 Claims, 4 Drawing Figures

DEVICE FOR PROVIDING A LEAK-TIGHT PENETRATION FOR ELECTRIC CABLES THROUGH A REACTOR VAULT ROOF

This invention relates to a device which provides a penetration for measuring cables through the vault roof of a nuclear reactor.

In more precise terms, the present invention is concerned with a device which provides a leak-tight penetration for the connecting cables between measuring detectors placed within a reactor vessel and units for processing the data collected by said measuring detectors, the data-processing units being placed outside the reactor vessel. A further object of said device is to make it possible by means of special arrangements to facilitate the achievement of leak-tightness at the level of the reactor vault roof penetration and the positioning of said cables at the time of construction of the nuclear reactor.

It is known that a nuclear reactor has to be equipped with a number of detectors which are placed at different locations within the reactor vessel and serve to control a certain number of parameters related either to reactor operation or to the state of the reactor structures. Particularly worthy of note among these detectors are the temperature sensors, the mechanical strain gages and vibration pickups which are placed at different points of the internal reactor structures.

The above-mentioned penetration devices are in fact more especially concerned with liquid sodium cooled fast reactors. It should indeed be noted in the first place that the pressure which exists within the reactor vessel is of relatively low value but that the liquid sodium is brought to a temperature above 400° C. and is highly corrosive. In consequence, the electric conductors for connecting the measuring detectors placed within the reactor vessel to the data-processing units placed outside the vessel must accordingly retain good electrical insulation even at high temperature as well as a sufficient degree of mechanical resistance. As a general rule, the insulation is provided by magnesium oxide and a thin outer sheath of stainless steel constitutes the mechanical barrier. This assembly is nevertheless relatively delicate and it is necessary to proceed with care as well as to ensure protection of this latter throughout all the operations involving assembly or connecting-up within the reactor. As a result of any damage caused to the magnesium oxide insulation, the detector concerned would in fact become unserviceable.

The diagrammatic vertical sectional view which is given in FIG. 1 of the accompanying drawings shows a liquid sodium cooled fast reactor enclosed within a concrete containment vault 2 closed at the top by a vault roof 4 which is also of concrete. A safety vessel 6 and a main vessel 8 containing the liquid sodium coolant are suspended from said vault roof 4. Provision is also made within said main vessel 8 for a core support structure 10 designated by the general reference 12. For the purpose of handling and refuelling operations, the reactor vault roof 4 is fitted in known manner with a large rotating shield plug 14 which is coaxial with the reactor vessel and a small rotating shield plug 16 which is mounted eccentrically with respect to the large rotating shield plug 14. Since these reactors are usually of the integrated type, provision is also made within the main vessel 8 for primary pumps such as those designated by the reference 18 and for primary heat exchangers such as those designated by the reference 20, the reactor vault roof being traversed by the pump bodies and heat-exchanger shells.

The general structure of the reactor has been described only in order to give a general idea of the different parts of this latter without thereby implying any limitation whatsoever. Since the invention is essentially concerned with the vault roof penetrations, the reactor structure has been described only in very broad outline.

It should further be noted that the main vessel 8 is partly filled with liquid sodium, the sodium level being designated by the reference 24. An argon gas blanket or so-called "sky" is present above the liquid sodium and designated by the reference 26. It can be understood that the reactor vault roof and its two rotating shield plugs 12 and 14 constitute on the one hand a biological protection with respect to the containment vault in which the reactor is placed and on the other hand a leak-tight barrier with respect to the blanket gas 26 in particular. It is therefore apparent that the penetration devices must also maintain leak-tightness between the interior of the reactor vessel and the outer containment vault.

The penetration device in accordance with the invention essentially comprises:

a vertical tube which is open at the lower end and closed at the upper end by means of a flange-plate providing a leak-tight connection with the reactor vault roof, said flange-plate being provided with a bore through which said cables are intended to pass, a removable closure hood mounted above said flange-plate, at least one horizontal plate which is mounted inside the tube and the periphery of which is joined to said tube in leak-tight manner, said plate or plates being provided with orifices for the leak-tight passage of said cables, at least one reel for the storage of said cables, that portion of said cables which is placed beneath said plate or plates being wound onto said reel or reels, and operable mechanical means constituted by a locking-bolt and rigidly fixed to said tube, said means being capable of taking up a locked position and an unlocked position in order to maintain said reels within said tube in the locked position and to release said reels from said tube in the unlocked position.

In accordance with a first distinctive feature of the invention, the leak-tight penetration through the aforementioned horizontal plate or plates consists of lead-in bushings which are inserted in orifices formed in said plate or plates and which are externally welded thereto, each lead-in bushing being traversed by a cable of slightly smaller diameter which is welded to both ends of said bushing.

In accordance with another distinctive feature, the aforementioned hood is constituted by a cylindrical shell having a bottom edge which is connected to said flange-plate and by a removable top cover which closes said hood, said cylindrical shell being fitted with at least one cable gland through which at least one connecting cable is intended to pass, said cable being fitted with a connecting plug which is capable of cooperating with connectors.

In accordance with a third distinctive feature, the removable bottom cover is rigidly fixed to the tube by means of a threaded rod which is screwed at one end into the horizontal plate or into one of the horizontal plates aforesaid and rigidly fixed to said bottom cover at the other end, said storage reels being passed over said rod.

A more complete understanding of the invention will in any case be obtained from the following description of a number of embodiments which are given by way of example without any limitation being implied, reference being made to the accompanying drawings, wherein:

FIG. 1, as already described in the foregoing, is a vertical sectional view of a liquid sodium cooled fast reactor;

Figure 2:
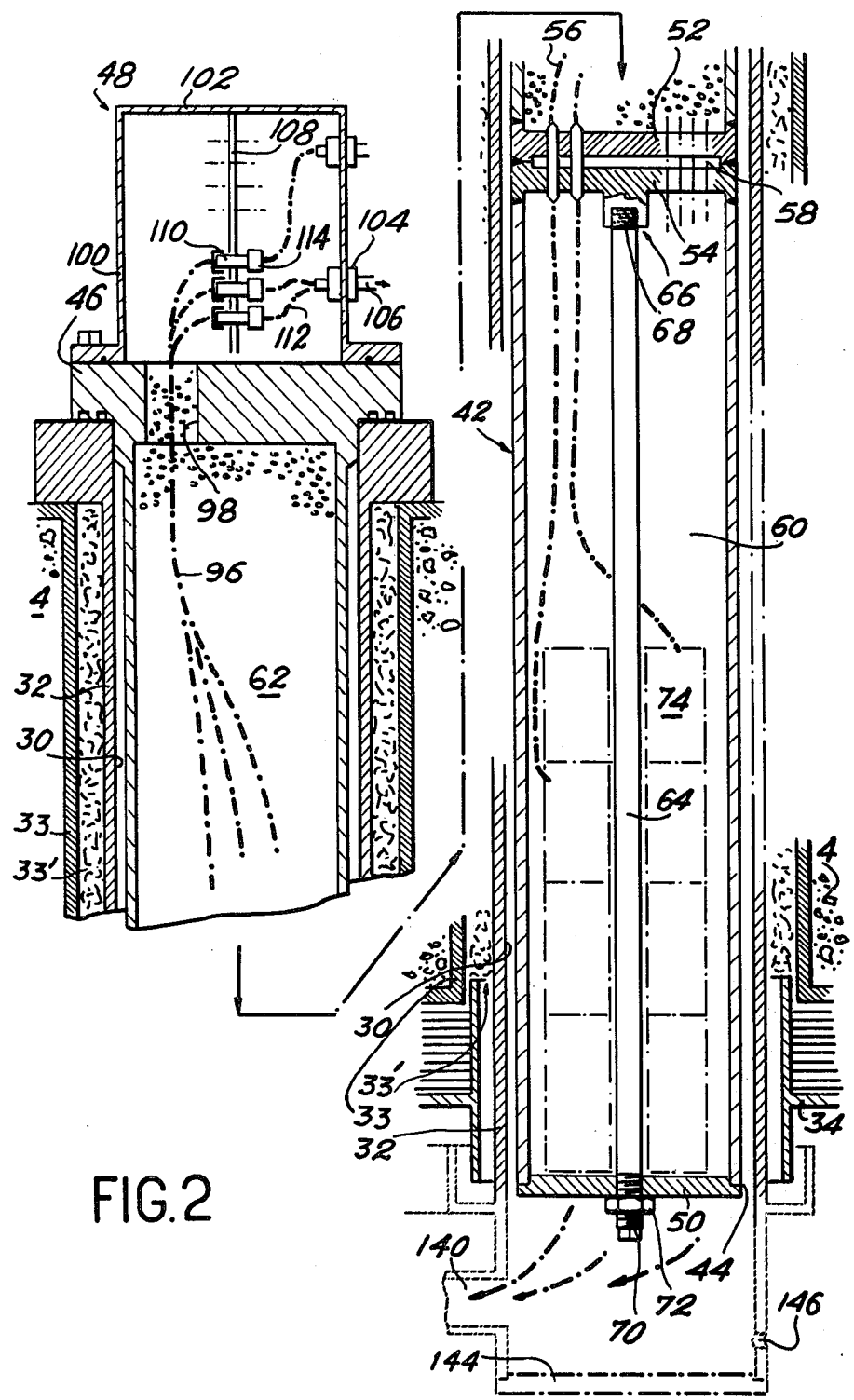
FIG. 2 is a vertical sectional view showing the entire reactor vault roof penetration device.

There is again shown in FIG. 2 the reactor vault roof 4 which is constructed of steel and packed with concrete. A vertical bore 30 is formed in the vault roof at the level of the penetration and surrounded by a vault roof penetration sleeve 32. Provision is also made for a thermal sleeve 33 which extends to a short distance beneath the bottom face 34 of the vault roof 4. A heat insulation packing 33' is interposed between the sleeves 32 and 33. The cylindrical bore defined by the sleeve 32 is employed for the introduction of the reactor vault roof penetration device in accordance with the invention. The device which is designated by the general reference 40 in FIG. 2 essentially comprises a vertical cylindrical tube 42 which is open at the lower end 44 and provided with a flange-plate 46 at the upper end thereof. The height of the tube 42 can be very slightly greater than the thickness of the reactor vault roof 4 as shown in the drawings. By way of example, said tube has a diameter of 285 mm and a height of the order of 3200 mm; the reactor vault roof has a thickness of 2900 mm to which is added the thickness of the heat insulation packing which is 100 mm in this instance. Provision is made above the flange-plate 46 for a removable hood which is closed at the top and is designated by the general reference 48. The lower end of the tube 42 which bears the reference 44 is closed by a temporary and removable cover 50, the intended function of which will hereinafter be explained in greater detail. Two plates located at right angles to the axis of the tube 42 are placed inside this latter and designated respectively by the references 52 and 54. As will be explained below, these plates are traversed by lead-in bushings and these latter are welded to the electric conductors which are associated with the measuring instruments. Said conductors are shown in chain-dotted lines 56 in this figure. A space 58 is formed between the two plates 52 and 54. Said plates divide the tube 42 into two regions, namely a lower region 60 which will be referred-to as the "storage zone" and an upper region 62 which will be referred-to as the "passage zone". In the lower zone or storage zone 60, there is placed along the axis of the tube 42 a vertical rod 64, the threaded end 66 of which cooperates with an internally-threaded portion 68 which is formed in the axis of the plate 54 and which does not necessarily extend completely through the plate 54. The rod 64 is employed for stacking reels and for removable attachment of the cover 50. Said rod is provided in addition with a second threaded portion 70 which cooperates with a nut 72.

It is apparent that, when the end of the rod 64 is fixed in the plate 54, the cover 50 is rigidly fixed to the lower end 44 of the tube 42. A predetermined number of cable storage reels represented diagrammatically in the figure by the rectangles 74 is slidably fitted around the rod 64, the design function of said reels being explained later in the description. It is readily apparent that the flange-plate 46 is fixed on the top face of the reactor vault roof 4 by any suitable means and is provided with devices for ensuring leak-tightness between said flange-plate and the vault roof in order to prevent leakages of blanket gas. In particular, use can be made of an anti-levitation flange-plate which is fixed on the vault roof by means of screws and covers part of the edge of the sleeve flange.

In the foregoing description, it is understood that the storage reels are maintained in the lower portion of the tube 42 (zone 60) by means of an operable locking-bolt constituted by the rod 64, the nut 72 and the cover 50. This mechanical locking-bolt could clearly be replaced by any other type of locking-bolt provided that the reels are maintained stationary in one position of the locking-bolt but released from the tube 42 in another position of said locking-bolt.

In particular, it is apparent that the cover 50 serves only as a mechanical protection for the cables and can in some cases be dispensed with.

Figure 3:
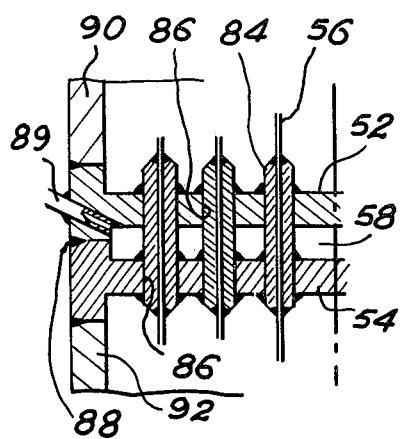
FIG. 3 is a detail view of the device in accordance with FIG. 2 and showing the penetration of the cables at the level of the seal plates.

Referring to FIG. 3, one embodiment of the plates 52 and 54 and of the corresponding cable penetrations will now be described in greater detail. At this level, the cables 56 have their special electrical insulation of magnesium oxide or of any other equivalent material covered with an outer sheath of stainless steel and have been passed through the tube within the upper passage zone 62. The cables 56 are first welded in leak-tight manner within small cylindrical lead-in bushings 84 which are advantageously formed of stainless steel, for example. Said lead-in bushings 84 are then inserted in uniformly spaced orifices which are formed in the plate 52 and 54 and are designated by the reference 86. The lead-in bushings 84 are then welded in position within the orifices 86 of the plates 52 and 54. Provision can clearly be made for a number of lead-in bushings 84 corresponding to the number of cables 56 and, in the example under consideration, said bushings are uniformly spaced in the plates 52 and 54 which are in the form of discs. The peripheral portion of each plate 52 and 54 is in fact provided with a flange 88, the height of which is greater than the thickness of the corresponding plate. The flanges 88 are welded together. Welding of the lead-in bushings through the plates 52 and 54 has thus been completed and the space 58 limited by the plates 52 and 54 is completely closed. At this stage of fabrication, tests are carried out in order to check the leak-tightness of the space 58, for example by means of the well-known helium test. The filler tube 89 which is employed for the test and inserted in the plate 52 can serve during reactor operation to introduce argon at a higher pressure than that of the sky of the reactor in order to constitute a barrier. The following stage consists in constructing the cylindrical tube 42. This tube is in fact constituted by an upper tubular portion 90 and a lower tubular portion 92. These portions are welded to the peripheral flanges 88 of the plates 52 and 54. There are thus been reconstituted the assembly comprising the tube 42 and the plates 52 and 54 fitted with lead-in bushings 84 for the introduction of the insulated cables 56. The flange-plate 46 then remains to be welded to the upper end of the tube 90. The lower end of each insulated cable 94 which has to be connected after assembly to the different measuring detectors placed within the reactor vessel must have a substantial length. For the purpose of transportation and protection, the lower end 94 of said cables is wound onto the storage reels 74 which are in turn held in position within the tube 42 by means of the removable cover 50. The insulated cables 56 are preferably twisted so as to form a bundle 96 above the plates 52 and 54 and said bundle traverses the flange-plate 46 through a bore 98. After passing through the bore 98, the insulated cables 56 are again opened-out within the top hood 48.

Referring to FIG. 2, there will now be described a first form of construction of the upper hood 48, a connection being established therein between the specially insulated cables 56 and the ordinary cables which serve to connect the measuring detectors to the units for processing the measurements performed by said detectors. In the embodiment shown in this figure, the hood 48 is constituted by a lateral cylindrical plate 100 which is fixed on the flange-plate 46, the hood being closed by a removable top cover 102. The hood 48 is thus completely closed. Provision is made within the cylindrical plate 100 for a certain number of cable glands 104 extending through said wall for the insertion of the multiwire cables 106, one end of which is connected to the different measuring instruments corresponding to the different detectors placed within the reactor vessel. A mounting-plate 108 within the hood 48 is provided with a certain number of connectors, the fixed portion 110 of which passes through the plate 108, said fixed portions of the connectors 110 being secured to the ends of the cables 56. One connector is provided for each cable in the example under consideration. After being passed through the cable gland 104, the cable 106 is opened-out so as to establish the necessary connections with the insulated cables 56. The conductors which constitute the multiwire cable 106 are of conventional type and are designated by the reference 112. Said conductors are fitted at the lower ends thereof with connecting jack-plugs 114 which cooperate with the fixed portions 110 of the connectors.

Figure 4:
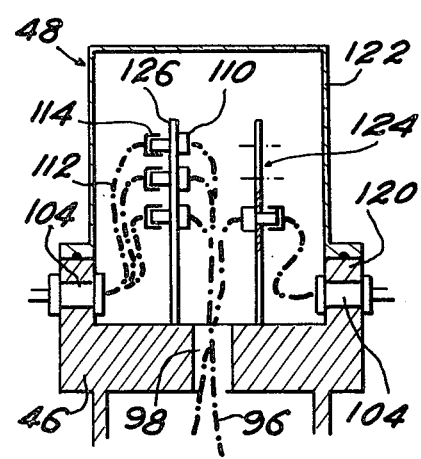
FIG. 4 is a vertical sectional view of a particular embodiment of the top hood.

FIG. 4 shows an alternative form of construction of the hood 48. This latter comprises a stationary cylindrical element 120 which is welded to the flange-plate 46 and fitted with cable glands 104. The hood is closed by the removable cover 122. In this embodiment, provision is made for two terminal plates designated respectively by the references 124 and 126. Said two terminal plates are preferably placed on each side of the bore 98 of the flange-plate 46, said bore being such as to have an axial position in this case. Similarly, the fixed portions of the connectors 110 are again shown on the terminal plates 124, the connecting jack-plugs 114 associated with the cables 112 being intended to be fixed in said fixed portions. It can be seen that this arrangement makes it possible to distribute the cable glands 104 over the entire periphery of the hood 48 and to provide easier access to the connecting plugs.

It is evident from the foregoing description that, by virtue of the particular structure of the device in accordance with the invention, all the difficult welding operations can be performed at works. This is the case in particular with the welding of the cables to the lead-in bushings 84, the welding of the lead-in bushings to the plates 52 and 54 and the welding of the plates 52 and 54 to each other. This clearly represents a considerable advantage since these welds are delicate and it is important to check leak-tightness of these latter.

As delivered from the works and prior to installation, the device is identical with that shown in full lines in FIG. 2. In other words, the bottom cover 50 is secured to the tube 42 by means of the rod 64, the lower ends 94 of the cables are wound onto the storage reels 74 within the storage zone 60, the upper ends of the cables 56 are attached to the fixed portions of the connectors 110 and these latter are welded to the terminal plate 108 or to the terminal plates 124 and 126, depending on the form of construction. It is apparent that this device can readily be transported without any risk of causing damage to the electric cables since these latter are completely enclosed on the one hand within the hood 48 and on the other hand within the tube 42. When the device reaches the reactor site, the entire tube 42 is inserted into the bore 30 of the reactor vault roof 4 and the device is fixed in position by means of the anti-levitation flange. The top closure cover 102 (or 122 as the case may be) is then removed, the cables 106 are passed through the cable glands 104 and the connecting jack-plugs 114 are fixed at the opened-out inner ends of said cables. Said connecting plugs are engaged in the fixed portions 110 of the connectors. An electrical connection has thus been established between the cables 104 and the cables 58. On completion of this operation, the rod 64 is unscrewed, thus releasing the bottom cover 50 and also releasing the storage reels 74. Individual locking or snap-fastening of the reels prevents the release of all these latter at the same time. The lower ends of the cables with detectors which are designated by the reference 94 are therefore free within the reactor vessel.

The complementary operations to be performed are shown in dotted lines in FIG. 2. The penetration sleeve 32 is in fact provided at the lower end with a guide tube 140 through which the insulated conductors 94 together with the detectors are passed. In order to maintain the conductors in position in the zone 60 of the tube 42, they can be fastened by means of cable clamps (not shown in the drawings). When all these operations have been completed, a closure plate 144 can be welded at the lower end of the penetration sleeve and vents 146 are formed in this latter.

Figure 1:
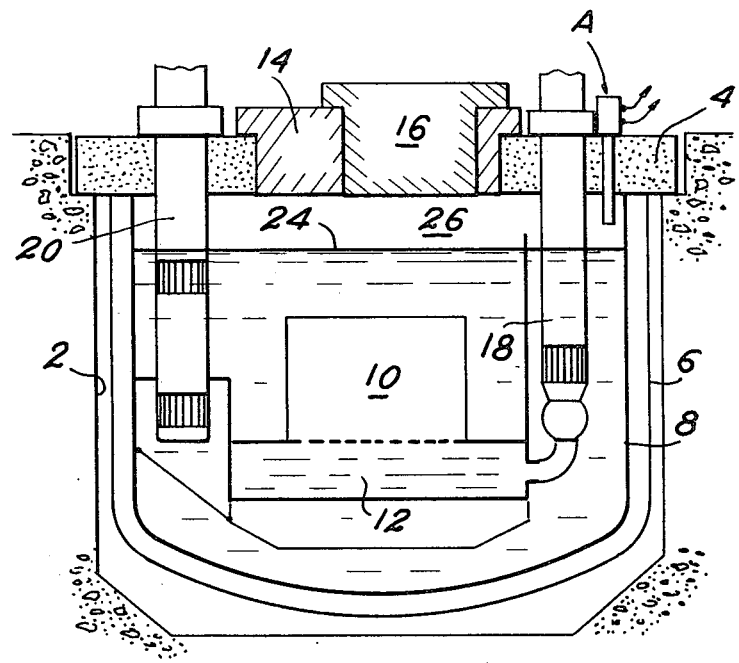

The penetration bores 30 are preferably formed in the stationary portion of the reactor vault roof 4 as shown at A in FIG. 1. However, consideration could be given to the possibility of installing the penetration devices within the large rotating shield plug or within the small rotating shield plug when the corresponding measuring instruments are attached either to the large or to the small rotating plug and do not need to be changed from one position to another during the entire operation of the reactor.

In even more precise terms, provision is made for two plates 52 and 54 when the penetration is located opposite to the primary circuit. When said penetrations are located outside the main vessel 8, it may be considered sufficient to provide only one plate within the tube 42, with the result that one of the plates 52 and 54 can be dispensed with. In this case, further leak tests can be contemplated at the level of the single remaining plate such as a simple ammonia test for example.

It can readily be understood that one of the main advantages of this device lies in the fact that all difficult welding operations can be performed in the works, especially operations relating to leak-tightness between cables and sealing plates. This makes it possible to make and check these welded joints much more effectively than if these operations had to be performed on the site.

What we claim is:

1. A device for providing a leak-tight penetration for electric cables through a horizontal reactor-vault roof of substantial thickness comprising at least one bore for accommodating the penetration device, wherein said device comprises:
- a vertical tube which is open at the lower end and closed at the upper end by means of a flange-plate providing a leak-tight connection with the reactor vault roof, said flange-plate being provided with a bore through which said cables are intended to pass,
- a removable closure hood mounted above said flange-plate,
- at least one horizontal plate which is mounted inside the tube and the periphery of which is joined to said tube in leak-tight manner, said plate or plates being provided with orifices for the leak-tight passage of said cables,
- at least one reel for the storage of said cables, that portion of said cables which is located beneath said horizontal plate or plates being wound onto said reel or reels, and
- operable mechanical means constituted by a locking-bolt and rigidly fixed to said tube, said means being capable of taking up a locked position and an unlocked position in order to maintain said reels within said tube in the locked position and to release said reels from said tube in the unlocked position.

2. A device according to claim 1, wherein the means for locking said reels consist of a removable cover fitted with means for removable attachment to the lower end of said tube.

3. A device according to claim 1, wherein the leak-tight penetration through the aforementioned horizontal plate or plates consist of lead-in bushings which are inserted in orifices formed in said plate or plates and which are externally welded thereto, each lead-in bushing being traversed by a cable of slightly smaller diameter which is welded to both ends of said bushing.

4. A device according to any one of claim 1, wherein said tube is constituted by two tube sections placed in end-to-end relation and welded to a peripheral flange of said plate or plates.

5. A device according to any one of claim 1, wherein the hood is constituted by a cylindrical shell having a bottom edge which is connected to said flange-plate and by a removable top cover which closes said hood, said cylindrical shell being fitted with at least one cable gland through which at least one connecting cable is intended to pass, said cable being fitted with a connecting plug adapted to cooperate with stationary connectors which are attached to the electric cables.

6. A device according to any one of claim 2, wherein the removable bottom cover is rigidly fixed to the tube by means of a threaded rod which is screwed at one end into the horizontal plate or into one of the horizontal plates aforesaid and rigidly fixed to said bottom cover at the other end, said storage reels being slidably fitted over said rod.

7. A device according to any one of claim 1, wherein said device comprises two support plates for the connectors, said support plates being placed on each side of the bore formed in said flange-plate and at right angles thereto.

8. A device according to any one of claim 1, wherein said tube comprises two plates located at right angles to said tube and forming a space therebetween, said space being fitted with a filler tube through which an inert gas under pressure can be injected.

* * * * *

UNITED STATES PATENT AND TRADEMARK OFFICE
CERTIFICATE OF CORRECTION

PATENT NO. : 4,142,937
DATED : March 6, 1979
INVENTOR(S) : Max Eyral and Armel Mahe It is certified that error appears in the above-identified patent and that said Letters Patent are hereby corrected as shown below:

In Claims 4, 5, 6, 7 and 8, line 1, the words "any one of" should be deleted.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks